(12) United States Patent
Takahashi (10) Patent No.: US 8,335,591 B2
(45) Date of Patent: Dec. 18, 2012

(54) ROBOT APPARATUS AND METHOD OF CONTROLLING THE SAME

(75) Inventor: Taro Takahashi, Chiba (JP)

(73) Assignee: Sony Corporation, Tokyo (JP)

( * ) Notice: Subject to any disclaimer, the term of this patent is extended or adjusted under 35 U.S.C. 154(b) by 996 days.

(21) Appl. No.: 12/206,857

(22) Filed: Sep. 9, 2008

(65) Prior Publication Data

US 2009/0069942 A1 Mar. 12, 2009

(30) Foreign Application Priority Data

Sep. 11, 2007 (JP) ................................ P2007-235981

(51) Int. Cl.
*G05B 15/00* (2006.01)
*B21B 37/58* (2006.01)
*B21B 29/00* (2006.01)
*B25J 3/04* (2006.01)

(52) U.S. Cl. ......... 700/260; 72/10.4; 72/10.7; 72/241.6; 901/9; 901/28; 414/5

(58) Field of Classification Search ............... 303/10, 303/13, 113.2; 72/10.4, 10.7, 241.6; 700/122, 700/260; 901/9, 28; 318/6–7; 244/223; 414/5

See application file for complete search history.

(56) References Cited

U.S. PATENT DOCUMENTS

| | | | | |
|---|---|---|---|---|
| 4,921,293 A | * | 5/1990 | Ruoff et al. | 294/111 |
| 5,469,531 A | * | 11/1995 | Faure et al. | 700/251 |
| 6,435,794 B1 | * | 8/2002 | Springer | 414/5 |
| 7,109,678 B2 | * | 9/2006 | Kraus et al. | 318/560 |
| 7,170,250 B2 | * | 1/2007 | Brenner | 318/560 |
| 2007/0185618 A1 | * | 8/2007 | Nagasaka | 700/245 |
| 2008/0303473 A1 | * | 12/2008 | Kato et al. | 318/568.18 |
| 2009/0200978 A1 | * | 8/2009 | Kato et al. | 318/566 |

FOREIGN PATENT DOCUMENTS

| | | |
|---|---|---|
| JP | 02-310609 | 12/1990 |
| JP | 5 143161 | 6/1993 |
| JP | 2770982 | 4/1998 |
| JP | 11-058285 | 3/1999 |
| JP | 2000-042962 | 2/2000 |
| JP | 3102451 | 8/2000 |
| JP | 2002 17352 | 1/2002 |

OTHER PUBLICATIONS

Japanese Office Action.

* cited by examiner

*Primary Examiner* — James Trammell
*Assistant Examiner* — Majdi Alsomiri
(74) *Attorney, Agent, or Firm* — Frommer Lawrence & Haug LLP; William S. Frommer; Ellen Marcie Emas (57) ABSTRACT

A robot apparatus has a multi-link structure including a plurality of links and joints serving as link movable sections, and in which at least some of the links are driven by combination of position control and force control. The apparatus includes: position controller performing position control on the links, which are driven by position control and force control; position controller with force constraint placing the force control before the position control so as not to cause a magnitude of an external force to exceed a set value; force controller performing the force control on the links; and integrated force/position controller controlling driving of the joints by switching the position controller, the position controller with force constraint, and the force controller, and unifying the position control and the force control.

11 Claims, 9 Drawing Sheets

Approach  Contact  Grasp

| Position Control | Position Control with Force Constraint | Force Control |
|---|---|---|

→ Time

FIG. 12 a. GLASS (43 mm, 62 g)

b. PAPER CUP (48 mm, 2.4 g)

c. RAW EGG (42 mm, 54 g, soft)

d. SOFT-BOILED EGG (43 mm, 63 g, hard)

e. BEAN CURD (30-30-30 mm, 36 g)

f. BEAN CURD (15-30-30 mm, 20 g)

ROBOT APPARATUS AND METHOD OF CONTROLLING THE SAME

CROSS REFERENCES TO RELATED APPLICATIONS

The present invention contains subject matter related to Japanese Patent Application JP 2007-235981 filed in the Japanese Patent Office on Sep. 11, 2007, the entire contents of which being incorporated herein by reference.

BACKGROUND OF THE INVENTION

1. Field of the Invention

The present invention relates to a robot apparatus such as a manipulator grasping an object or a legged mobile robot having a multilink structure, which includes a plurality of links and joints serving link movable sections, and a method of controlling a robot apparatus. More particularly, the present invention relates to a robot apparatus in which links are controlled by combination of position control and force control, and a method of controlling a robot apparatus.

To be more specific, the present invention relates to a robot apparatus that switches position control and force control when colliding against an object, and a method of controlling a robot apparatus. More particularly, the present invention relates to a robot apparatus and a method of controlling the same.

2. Description of the Related Art

Researches on and developments of multi-joint robots such as manipulators grasping an object and legged mobile robots have progressed in recent years. These robot apparatuses are widely used for the purpose of automation of manufacturing works in factories, acting for difficult works in dangerous scenes such as nuclear power plants, or interaction with people aimed at nursing care or entertainment.

As a method of controlling a robot having a multi-link structure, which includes a plurality of links and joints serving as link movable sections, for example, position control and force control are exemplified. The position control is a control method that sets a reference position such as the tip of the hand and the finger tip of the arm to an arbitrary position on a predetermined position coordinate. The force control is a control method which directly receives the target value of a force to be applied to an object of work and specifies the force corresponding to the target value. In addition, there is known compliance control which alleviates an external force to be applied at a contact position of the tip of the hand or the finger tip and the object by indirectly specifying virtual impedance.

Most of the known robot apparatuses are driven by position control since position control facilitates the ease of control or the design of system configuration. The position control is basically aimed at keeping the position and accordingly it is commonly called "hard control". The position control is not suitable for flexibly responding an external force and precisely controlling the velocity and acceleration. Since a robot apparatus carries out a task while physically interacting with various external worlds, for example, grasps an object, the position control is not suitable for the robot apparatus by nature. In the position control-type robot apparatus, it is difficult to perform a work to model after an object or fit the object.

Meanwhile, if the robot apparatus is allowed to have the same force control function as that of the arm of the human being, the application range of the robot apparatus is dramatically increased. Ideally, it is desirable that the robot apparatus is driven by a force control system, although the control rule and the system configuration are complicated. However, if the force control is used, the driving speed is low, as compared with the position control, and accordingly the work time is extended.

As the known researches on the force control, there is known a method that performs hybrid position/force control for each axis in such a manner that position control is performed in an X-axis direction and force control is performed in a Y-axis direction (for example, see M. H. Raibert, John J. Craig: Hybrid Position/Force Control of Manipulators, Journal of Dynamic Systems, Measurement, and Control 102, ASME, pp. 1026-1033, 1981). In addition, there are also known a method that expands the hybrid position/force control with the work coordinate system as reference (for example, see O. Khatib: A Unified Approach for Motion and Force Control of Robot Manipulators: The Operational Space Formulation, IEEE Journal of Robotics and Automation, Vol. RA-3, No. 101987), and mechanical impedance control in which a virtual spring is provided at the tip of the finger (for example, see N. Hogan: An Approach to Manipulation: Part 1 to 3, Journal of Dynamic Systems, Measurement, and Control 107, ASME, 1985).

However, the force control method may encounter problems in that: it is assumed the geometric position of a contact surface is known; an unreasonable force is applied due to an error when position control is performed at the contact surface; a control characteristic extremely deviates from its design specification due to a variation in elasticity or frictional coefficient of a contact surface defining a restricted space; and a control system becomes unstable (for example, see Japanese Patent No. 3124519, Paragraphs 0002-0003).

When position control or force control is designated by a selected matrix with respect to each component of the coordinate system, switching between position control and force control is discontinuous, and accordingly a shock may occur during switching (for example, see Japanese Patent No. 2770982, page 2, right column, lines 34-44).

In particular, when the tip of the hand or the finger tip collides against an object, it is necessary to switch its driving method from position control to force control. For example, there is known a control method for collision process which indicatively discusses stability of a grasp system by a Lyapunov's method with a manipulator as a mass-spring-damper system (for example, see Shoji, Inaba, Fukuda, and Hosogai: Stable Control for Robot Manipulator facing collision, Japan Mechanical Association Symposium (Chapter C), Vol. 56-527, pp. 1847-1853, 1990). In this case, however, similarly to the above-described mechanical impedance control (N. Hogan: An Approach to Manipulation: Part 1 to 3, Journal of Dynamic Systems, Measurement, and Control 107, ASME, 1985), an unreasonable force may be applied to the contact surface according to a geometric error. There is also known a method in which in which an optimum approaching speed prior to the contact is preliminarily obtained so as not to cause a large impact force, and position control is switched over to force control at the time point when a detected force value succeeding to the contact exceeds a threshold value (for example, see Kitagaki and Uchiyama: Optimum Approaching Speed for Manipulator in Ambient Condition (Japan Robot Association Journal Vol. 8-4, pp. 413-420, 1990)). In this case, however, a decrease in the speed may cause deterioration of work efficiency. There is also known a method that performs force control including robust position control (for example, see Shimura and Hori: Robust Force Control for Robot Manipulator and Control for Collision Process (Japan Robot Association Journal vol. 11-2, pp. 235-245, 1993)). In this case, high control performance and high practical utility for a wide range of situations can be achieved. However, when the nominal stiffness used in the control system is smaller than the stiffness in the actual environment (that is, an actually hard object is assumed as a soft object), an excessive force may occur. There is also known a method in which a control mode having a large damping characteristic is once inserted at the time of switching (for example, see O. Khatib, J. Burdic: Motion and Force Control of Robot Manipulators, IEEE Conference on Robotics and Automation, pp. 1381-1386, 1986). In this case, however, the purpose of the operation is achieved only in a limited situation, and practical utility is lacking.

There is also known a method in which a virtual spring constant is increased/decreased with respect to each component of a tool coordinate system to set a degree of coordination between a position and a force, and when the spring constant is an intermediate, an arm moves up to a point at which a force corresponding to a positional deviation is set in equilibrium and undergoes a motion as if a manipulator is supported by a spring (for example, see Japanese Patent No. 2770982, page 3, right column, line 21 to page 4, right column, line 104). In this case, however, a method of setting the virtual spring constant is not clear. In addition, stability is secured only by a low pass filter with respect to a force sensor value and a force command, and accordingly responsiveness is expected to be deteriorated.

There is also known a robot controller which moves a workpiece to approach an estimated contact surface in a free space under position control, performs a groping motion from the estimated contact surface to an actual contact surface under position control, and at a point of time at which a detected force value exceeds a threshold value, switches over to a contact motion under force control (for example, see Japanese Patent No. 3124519, paragraphs 0009-0015). This control method is a robust control system which takes stability into consideration, and it can achieve smooth control mode switching and high practical utility. In this case, however, since sliding mode control is used, a control system or a design method is complicated.

There is also known a kinematically stable hybrid control system that controls the displacement of an end effector of a robot manipulator and the force exerted thereby (for example, see JP-A-5-143161). In this case, however, since it is assumed the geometric position of a contact surface is known, when an error occurs, an excessive force may be generated, and accordingly a control system may become unstable.

There is also known a force control device in which a press section driven by a motor is continuously switched over from position control to torque control. Under the position control, an operation is made at a speed of a speed command generator by a limiter, and when it is close to a force command from a force detector, the speed command is automatically switched over to a force command from a force command generator (for example, see JP-A-2002-177352). In this case, switching is made at a prescribed switching position, and it is assumed the geometric position of a contact surface is known. Accordingly, when an error occurs, an excessive force may be generated, or a control system may become unstable.

SUMMARY OF THE INVENTION

It is desirable to provide a superior robot apparatus in which links are appropriately controlled by combination of position control and force control, and a method of controlling such a robot apparatus.

It is also desirable to provide a superior robot apparatus which can smoothly perform switching between position control and force control when colliding against an object, and a method of controlling such a robot apparatus.

It is also desirable to provide a superior robot apparatus which, even if positional information or shape information of an object to contact is not accurate under position control, can prevent a large impact force from being applied, and a method of controlling such a robot apparatus.

It is also desirable to provide a superior robot apparatus which, when colliding against an object to contact due to incorrect positional information or shape information of the object under position control, can appropriately follow a contact force applied immediately thereafter, and a method of controlling such a robot apparatus.

According to an embodiment of the invention, there is provided a robot apparatus which has a multi-link structure including a plurality of links and joints serving as link movable sections, and in which at least some of the links are driven by combination of position control and force control.

The robot apparatus includes: a position controller that performs the position control on the links, which are driven by the combination of position control and force control; a position controller with force constraint that places the force control before the position control so as not to cause the magnitude of an external force to exceed a set value even if the position control is performed on the links; a force controller that performs the force control on the links; and an integrated force/position controller that controls to drive the joints by switching the position controller, the position controller with force constraint, and the force controller, and unifies the position control and the force control.

As a method of driving the links in a multi-link robot apparatus, the position control and the force control are exemplified. It is necessary to perform the position control and the force control when the robot apparatus approaches an object and when the robot apparatus grasps the object, respectively. The embodiment of the invention provides a robot apparatus in which the position control and the force control are unified, and is configured such that switching between the position control and the force control is made when the robot apparatus collides against the object. Here, switching between the position control and the force control is made with respect to each axis. Switching between the position control and the force control is made with respect to a single axis. In addition, since switching can be made during the operation, there is no case in which it interferes with the hand operation.

In respects to the general grasp operation of the robot apparatus, a contact position is preliminarily determined from positional information or shape information of the object, and then the finger tip is moved to grasp the object. However, when the positional information or shape information is incorrect, the robot apparatus may be failed to grasp the object, and the object to grasp may fall down or destroyed.

In contrast, according to the embodiment of the invention, in order to suppress such a failure due to an error in the positional information or shape information of the object, the position controller with force constraint is provided, in addition to the position controller and the force controller. With this configuration, during a phase in which the finger approaches the object (Approach), control by the position controller is performed, and during a phase in which a force is applied to the object to grasp (Grasp), control by the force controller is performed. Meanwhile, when the finger comes into contact with (or collides against) the object between the two phases (Contact), control by the position controller with force constraint is performed. If the finger tip or the tip of the hand comes into contact with the object during the approach under the position control, the position controller with force constraint places suppressing the application of a large impact force before satisfying a position target value.

The position controller and the position controller with force constraint generate a force target value of each link from a position target value for the link. Accordingly, the robot apparatus is basically configured to perform the acceleration control on the links. Accordingly, the position controller with force constraint sets a predetermined force limit value, when the force target value obtained by transforming the position target value for each link does not exceed the force limit value, outputs the force target value as it is, and when the force target value exceeds the force limit value, substitutes the force target value with the force limit value and outputs the force limit value. Therefore, for example, even if the link of a manipulator grasping the object is under the position control, by setting an external force restriction condition, when colliding against the object, the robot apparatus can follow a contact force applied immediately after the collision without significantly exceeding a prescribed contact force.

As described above, in the robot apparatus according to the embodiment of the invention, the position controller, the position controller with force constraint, and the force controller are all based on acceleration control. Accordingly, responsiveness is satisfactory, robustness is high, and a design method of a control system is simple. The position controller and the position controller with force constraint transform the position target value for each joint into a force command value of the joint, for example, by using a PD (Proportional Differential) controller.

In the robot apparatus according to the embodiment of the invention, in order to unify the position control and the force control, the position controller and the position controller with force constraint generate the force target value from the position target value. Accordingly, during switching between the position control and the force control, a behavior is smooth. In addition, the position control is automatically switched over to the force control according to the magnitude of an external force occurring when contact, and the external force follows a maximum external force value immediately thereafter. Accordingly, the coordination with grasp control by the subsequent force control is easily achieved. For example, when the finger tip or the tip of the hand comes into contact with an external world, such as an object, a contact force can be accurately applied immediately thereafter, a plan for grasping or operation is easily established.

The robot apparatus according to the embodiment of the invention is adapted to perform robust acceleration control. As a method for force control, a method which uses linearization such as inverse dynamics arithmetic compensation is exemplified. However, in the robot apparatus according to the embodiment of the invention, linearization is made by robust control with disturbance torque estimated by a so-called disturbance observer, and thus a particular linearization device does not need to be provided. Under the robust control by the disturbance observer, in addition to the influence of gravity, centrifugal force, and Coriolis force, the influence of gear friction or cable weight difficult to model is estimated and suppressed by the observer. In addition, it is advantageous in view of computing cost, and it is possible to reduce a control cycle.

According to the embodiment of the invention, it is possible to provide a superior robot apparatus in which each link is appropriately controlled by combination of position control and force control, and a method of controlling such a robot apparatus.

According to the embodiment of the invention, it is possible to provide a superior robot apparatus which can smoothly perform switching between position control and force control when colliding against an object, and a method of controlling such a robot apparatus.

According to the embodiment of the invention, it is possible to provide a superior robot apparatus which, even if positional information or shape information of an object to contact is not accurate under position control, can prevent a large impact force from being applied, and a method of controlling such a robot apparatus.

According to the embodiment of the invention, it is possible to a superior robot apparatus which, when colliding against an object to contact due to incorrect positional information or shape information of the object under position control, can appropriately follow a contact force applied immediately thereafter, and a method of controlling such a robot apparatus.

Other objects, features, and advantages of the invention will be apparent from the detailed description by way of the following embodiments or the accompanying drawings.

DETAILED DESCRIPTION OF THE INVENTION

Hereinafter, embodiments of the invention will be described in detail with reference to the drawings.

An embodiment of the invention provides a robot apparatus which has a multi-link structure including a plurality of links and joints serving as link movable sections, and to which a hybrid control system is applied in which position control and force control are unified. That is, at least some of the links are driven by combination of position control and force control. It is necessary to perform the position control and the force control when the robot apparatus approaches an object and when the robot apparatus grasps the object, respectively. The robot apparatus according to the embodiment of the invention performs switching between the position control and the force control when colliding against the object.

When there is an error in positional information or shape information of an object to contact (for example, an object grasped by a manipulator), the robot apparatus may be failed to grasp the object and the object to grasp may fall down or destroyed. In contrast, if the finger tip or the tip of the hand comes into contact with the object, the robot apparatus according to the embodiment of the invention places suppressing the application of a large impact force before satisfying a position target value during the approach under the position control. Therefore, even under the position control, when colliding against the object, the robot apparatus can follow a contact force applied immediately after the collision without significantly exceeding a prescribed contact force.

Figure 1:
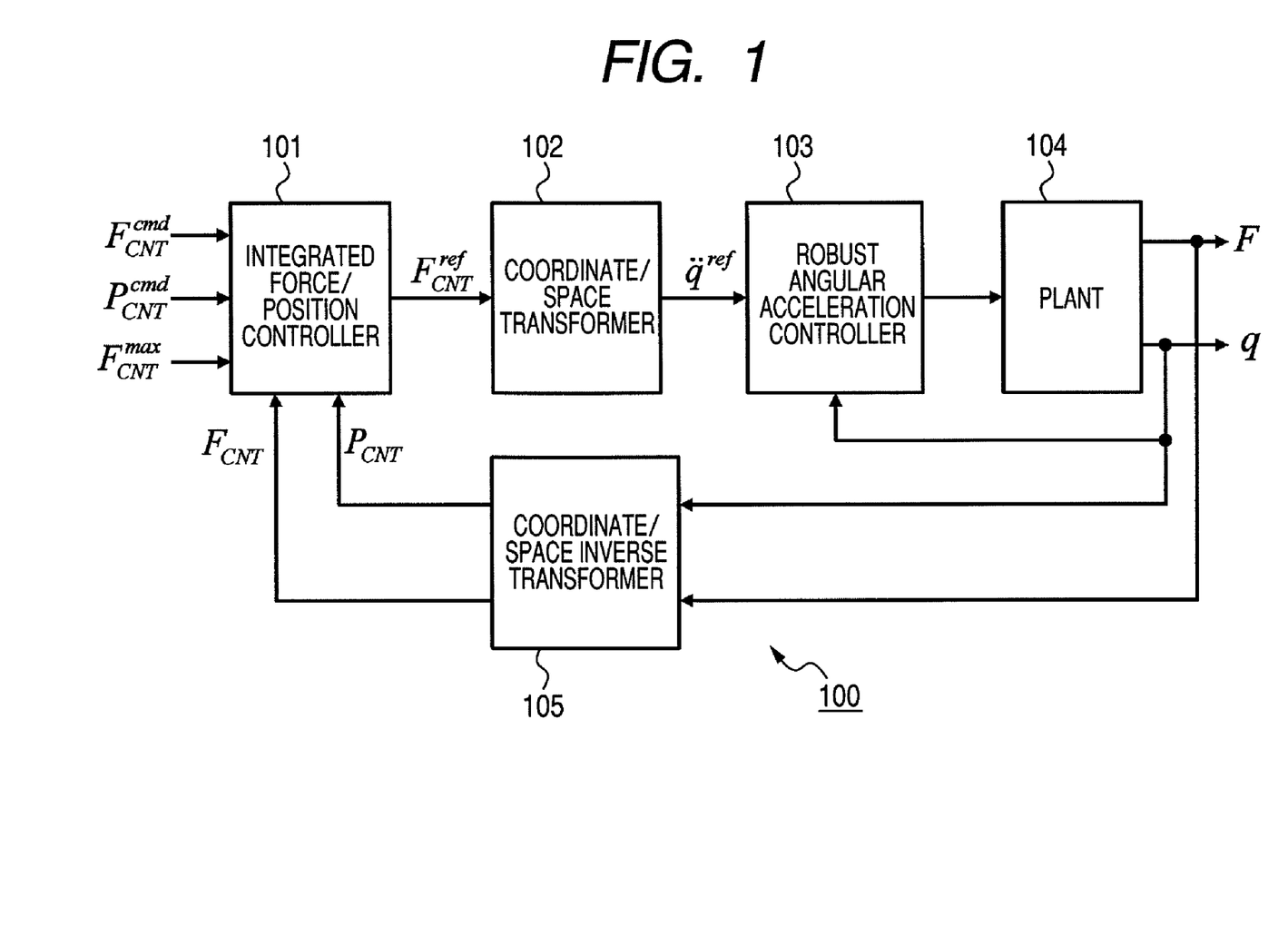
FIG. 1 is a diagram schematically showing a control system of a robot apparatus according to an embodiment of the invention.

Control System Configuration:

FIG. 1 schematically shows the configuration of a control system which controls to drive the links or joints of the robot apparatus to be controlled. A control system 100 shown in FIG. 1 includes a plant 104 serving as a current-controlled servo motor and a mechanical system, an integrated force/position controller 101 that unifically performs position control and force control, a coordinate/space transformer 102, a robust angular acceleration controller 103, and a coordinate/space inverse transformer 105.

The integrated force/position controller 101 inputs a force target value $F_{CNT}{}^{CMD}$ during a force control mode, and inputs a position target value $P_{CNT}{}^{cmd}$ during a position control mode. Then, in any control mode, the integrated force/position controller 101 outputs a force command value $F_{CNT}{}^{ref}$. In all of the control modes, the control system 100 is grounded in acceleration control. During the position control mode, the integrated force/position controller 101 transforms the position target value into the force target value.

In addition, the integrated force/position controller 101 unifies the position control and the force control. When the robot apparatus approaches the object, the position control is performed, and when the robot apparatus grasps the object, the force control is performed. Meanwhile, in order to suppress a failure such as unsuccessful grasping and falling down or destroy of the object to grasp due to an error in the positional information or shape information of the object to grasp, the position controller with force constraint is provided. In addition, suppressing the application of a large impact force takes precedence over satisfying the position target value. Position control with force constraint will be described below in detail.

The coordinate/space transformer 102 transforms a target value described in a base coordinate system into an arbitrary coordinate system (for example, "contact reference coordinate system" described below). Specifically, if the force command value $F_{CNT}{}^{ref}$ is input from the integrated force/position controller 101, the force command value $F_{CNT}{}^{ref}$ which is a force command expressed in a coordinate system for the force control is transformed into an angular acceleration command value which is an angular acceleration command for a joint angle q in a joint space.

If the angular acceleration command value is input, the robust angular acceleration controller 103 generates a current command value $I^{ref}$ for controlling to drive the current-controlled plant 104, that is, a joint driving servo motor. In this embodiment, the robust angular acceleration controller 103 has a disturbance observer function to estimate disturbance torque, thereby achieving robust force control.

The joint driving servo motor constituting the plant 104 outputs torque F according to the input current command value $I^{ref}$. The output torque F of the servo motor or the rotation angle q is monitored at a gear output stage of the motor.

The coordinate/space inverse transformer 105 transforms the output torque F of the motor and the rotation angle q, which are obtained in the contact reference coordinate system, into the base coordinate system, and generates a force control value $F_{CNT}$ and a position control value $P_{CNT}$, which are fed back to the integrated force/position controller 101.

Hereinafter, the operation of the individual functional modules 101 to 105 constituting the control system 100 and a processing procedure will be described in detail by way of a case in which a manipulator having a plurality of fingers grasps an object.

Robust Angular Acceleration Controller:

In this embodiment, the robust angular acceleration controller 103 constructs a robust acceleration control system that estimates various disturbances acting on the motor by using a disturbance observer and eliminates the influence of the disturbances on the control system.

Disturbance torque $F^{dis}$ acting on the motor may be expressed by Equation (1). In Equation (1), $I^{ref}$ denotes a current command value that is input to the motor (plant 104), J denotes motor inertia, $K_t$ denotes a torque constant of the motor, θ denotes a motor angle, and ω denotes an angular velocity of the motor. The subscript n denotes a nominal value.

$$F^{dis}=(J-J_n)\dot{\omega}+(K_{tn}-K_t)I^{ref}+F_c+D\omega+F^{ext} \quad (1)$$

On the right side of Equation (1), the first term denotes an inertial change, the second term denotes a torque ripple, the third term $F_c$ denotes a Coulomb's frictional force, the fourth term Dω denotes a viscous frictional force, and the fifth term $F^{ext}$ denotes an external force.

Figure 2:
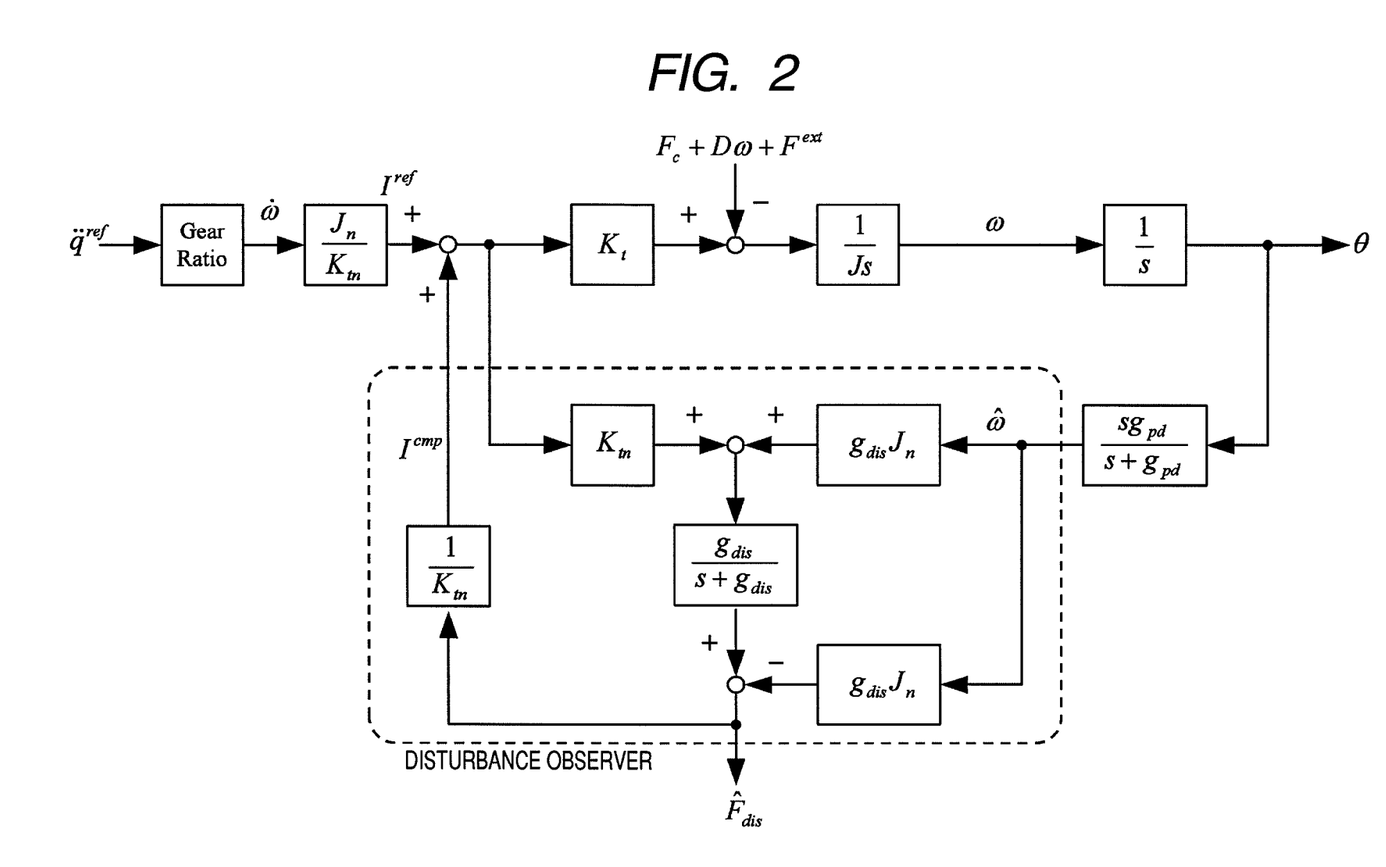
FIG. 2 is a control block diagram of a robust angular acceleration controller 103.

FIG. 2 is a control block diagram of the robust angular acceleration controller 103. In FIG. 2, a portion encircled by a dotted line corresponds to a disturbance observer, which suppresses disturbances such as influence of the weight of the servo motor, friction in a reduction gear, and influence of the weight of a cable, and improves the robustness of the control system.

The robust angular acceleration controller 103 receives the angular acceleration command value for the rotation angle q as a command to a joint from the coordinate/space transformer 102. The angular acceleration command value is multiplied by a gear ratio to implement the temporal differential of an angular velocity ω of the motor (that is, before deceleration). In addition, the calculated value is also multiplied by a gain $J_n/K_{tn}$ ($J_n$ denotes a nominal value of motor inertia, and $K_{tn}$ of the torque constant denotes a nominal value of $K_t$) to obtain the current command value $I^{ref}$ as a target value for the motor. Then, a value obtained by multiplying the current command value $I^{ref}$ by the torque constant $K_t$ becomes a theoretical output torque of the motor.

Here, the Coulomb's frictional force, the viscous frictional force, and the external force corresponding to the third to fifth terms on the right side of Equation (1) are applied as disturbances. If the disturbances are subtracted from the theoretical output torque of the motor, the calculated value is divided by the motor inertia, and an integral is performed on the time axis, the angular velocity ω of the motor is obtained. If the angular velocity is further integrated on the time axis, the rotation angle θ of the motor is obtained. The rotation angle θ may be detected by an encoder, which is provided at an output stage of the reduction gear of the motor.

Although $K_t$ is a real torque constant, only its nominal value $K_{tn}$ is known. In other words, only the nominal output torque, which is obtained by multiplying the current command value $I^{ref}$ by the torque constant $K_{tn}$, is known. Meanwhile, if pseudo differential is applied to the rotation angle of the motor undergoes, the estimated value of the angular velocity ω of the motor is obtained.

If the current command value $I^{ref}$ and the angular velocity ω of the motor can be detected by pseudo differential of an angle having a band of a cutoff frequency $g_{dis}$, the disturbance observer can estimate the disturbance expressed by Equation (1) through a primary low pass filter, as expressed by Equation (2).

$$\hat{F}^{dis} = \frac{\frac{J_n}{J} g_{dis}}{s + g_{dis}^*} F^{dis} \quad (2)$$

However, the cutoff frequency $g_{dis}$ is a setting parameter given to the disturbance observer to determine the band of a disturbance to be suppressed, and expressed by Equation (3).

$$g_{dis}^* = \frac{K_t}{K_{tn}} \frac{J_n}{J} g_{dis} \quad (3)$$

The robust angular acceleration controller 103 divides the estimated disturbance torque expressed by Equation (2) by the nominal value $K_{tn}$ of the torque constant to output a compensation current $I^{cmp}$ (see Equation (4)). And, the robust angular acceleration controller 103 feeds back the compensation current $I^{cmp}$ to the current command value $I^{ref}$, such that a robust control system against the disturbance can be constructed.

$$I^{cmp} = \frac{1}{Ktn} \hat{F}^{dis} \quad (4)$$

The behavior of the motor is identical to a behavior when torque corresponding to the torque command value is generated by an ideal motor of $J_n$ and $B_n$. Accordingly, an acceleration control system is constructed by the gain of $J_n/K_{tn}$. That is, the control system 100 is grounded in the acceleration control.

Moreover, the disturbance observer is described in the following three documents.

(1) K. Ohishi, K. Ohnishi K. Miyachi: "Torque-Speed Regulation of DC Motor Based on Load Torque Estimation" (Proceedings of the IEEJ International Power Electronics Conference, IPEC-TOKYO, Vol. 2, pp. 10209-10216, 1983)

(2) K. Ohnishi, N. Matsui, Y. Hori: "Estimation, Identification, and Sensorless Control in Motion Control System" (Proceedings of the IEEE, Vol. 82, No. 8, pp. 10253-10265, 1994)

(3) K. Ohnishi, M. Shibata, T. Murakami: "Motion Control for Advanced Mechatronics" (IEEE/ASME Transactions on Mechatronics, Vol. 1, No. 1, pp. 56-67, March, 1996)

Coordinate/Space Transformer:

It is advantageous that the integrated force/position controller 101 can operate on an arbitrary coordinate system, in addition, the base coordinate system. Accordingly, the coordinate/space transformer 102 sets the "contact reference coordinate system", prepares the target value in that coordinated system, and performs a control.

The coordinate/space transformer 102 transforms the force command value $F_{CNT}^{ref}$ input from the integrated force/position controller 101 into a joint angular acceleration command value by Equation (5). That is, the joint angular acceleration command value is obtained by performing coordinate transform with a transform matrix $^{BASE}T_{CNT}$ to the base coordinate system of the hand, transforming the base coordinate system into a joint matrix with Jacobian's transpose matrix $Jaco^T$, and multiplying the force command value $F_{CNT}^{ref}$ by the reciprocal of the nominal value $J_n$ of joint inertia.

$$\omega^{ref} = \frac{1}{J_n} Jaco^{T\,BASE} T_{CNT} F_{CNT}^{ref} \quad (5)$$

Meanwhile, the coordinate/space inverse transformer 105 performs coordinate transforms the output torque F of the motor and the rotation angle q, which are obtained in the contact reference coordinate system, into the base coordinate system by Equations (6) and (7), and generates the force control value $F_{CNT}$ and the position control value $P_{CNT}$, which are fed back to the integrated force/position controller 101.

$$F_{CNT} = {}^{CNT}T_{BASE} \, {}^{BASE}T_{ForceSensor} F \quad (6)$$

$$P_{CNT} = {}^{CNT}T_{BASE} f(q) \quad (7)$$

Here, f(q) denotes transform from the joint angle q into a finger tip position $^{BASE}P$ (forward kinematics).

Figure 3:
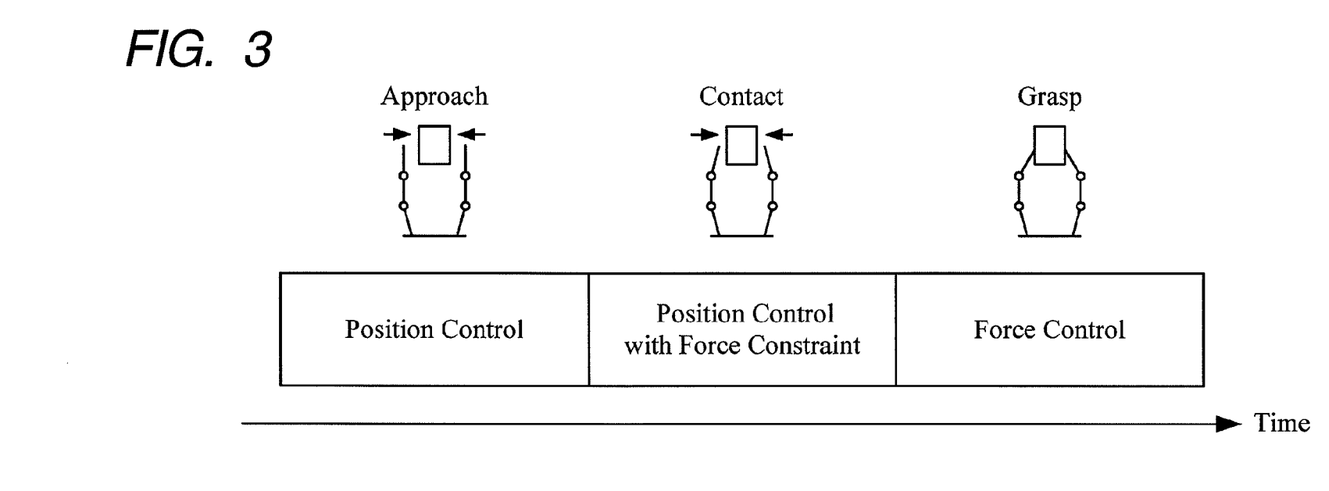
FIG. 3 is a diagram illustrating an operation phase in which a manipulator having a plurality of fingers grasps an object.

Integrated Force/Position Controller:

When a manipulator having a plurality of fingers grasps an object, as shown in FIG. 3, the operation is divided into a phase in which a finger approaches the object during a position control (Approach), and a phase in which a force is applied to the object to grasp during the force control mode (Grasp). In addition, when the finger comes into contact with (or collides against) the object between the two phases (Contact), a control mode is provided that, even if the position control is performed, places the force control before the position control so as not to cause the magnitude of the external force to exceed a set value. This control mode is called "position control mode with force constraint".

Figure 4:
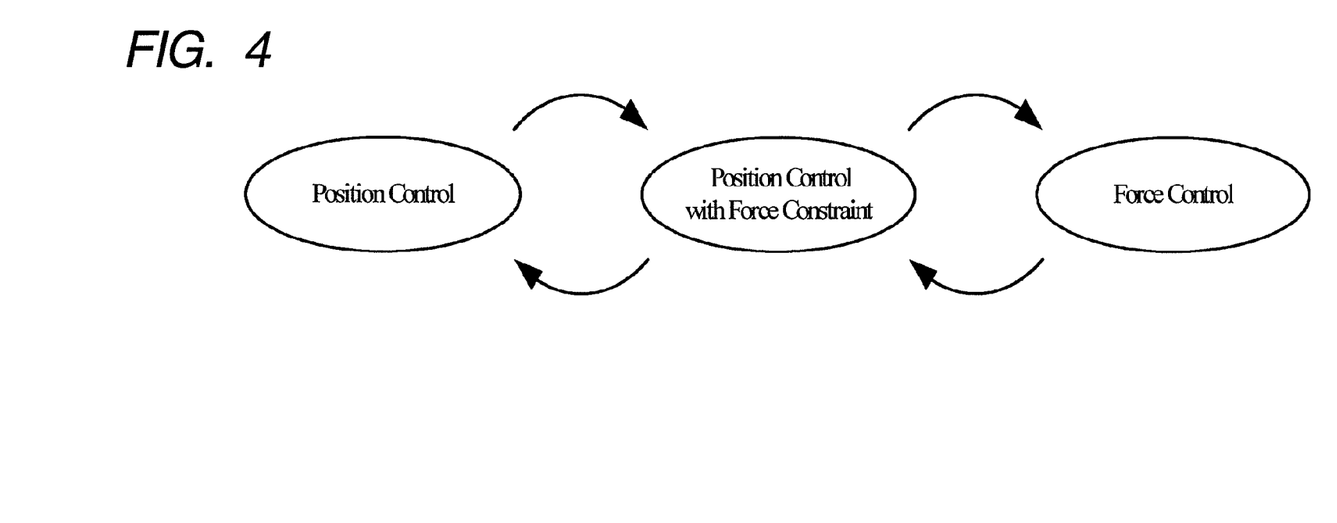
FIG. 4 is a state transition diagram showing switching between three control modes of a position control mode, a position control mode with force constraint, and a force control mode.

FIG. 4 is a state transition diagram showing switching between the three control modes. The three control modes can be switched over to each other freely. It is assumed that a transition time between the control modes is 1 second. In addition, the position control mode with force constraint is instantaneously and continuously switched over to the force control so as not to cause the external force to exceed the set value.

As described above, if switching between the position control and the force control is discontinuous, a shock occurs when switching. In this embodiment, the integrated force/position controller 101 implements a smooth operation from the position control mode to the force control mode while maintaining continuity.

Figure 5:
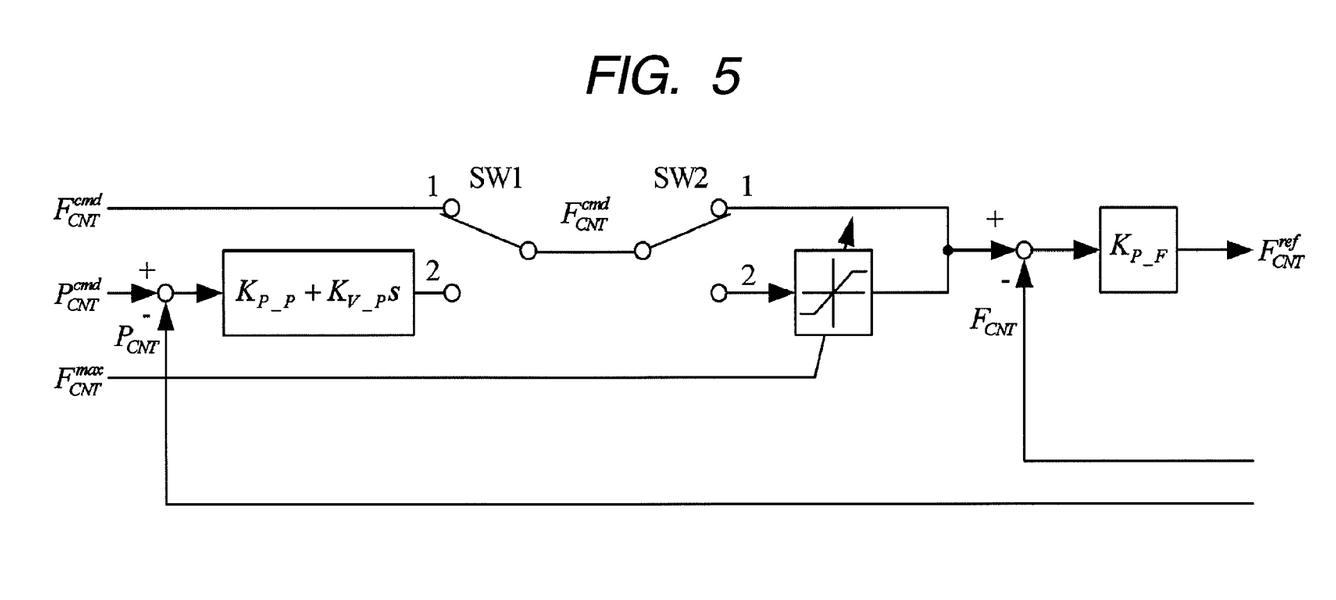
FIG. 5 is a diagram showing the configuration of an integrated force/position controller 101.

FIG. 5 shows the configuration of the integrated force/position controller 101. In FIG. 5, switches SW1 and SW2 are switched over according to a current control mode, as shown in Table 1. In order to make the target values continuous, when the switch SW1 is switched over, the values of terminals 1 and 2 are gradually cross-faded. In addition, when the switch SW2 is switched over, a limit value $F_{CNT}^{max}$ of a limiter and an output of a PD controller (described below) are cross-faded. The transition time between the modes is 1.0 second. Furthermore, under the position control mode with force constraint, when the limiter operates according to the external force, the position control and the force control are switched over to each other instantaneously.

TABLE 1

|  | SW1 | SW2 |
|---|---|---|
| FORCE CONTROL | 1 | 1 |
| POSITION CONTROL WITH FORCE CONSTRAINT | 2 | 2 |
| POSITION CONTROL | 2 | 1 |

Under the force control mode, the switches SW1 and SW2 in FIG. 5 are both connected to the terminal 1. Accordingly, the integrated force/position controller 101 generates a force command value $F_{CNT}^{ref}$ expressed by Equation (8) on the basis of the input force target value $F_{CNT}^{cmd}$ and the force control value $F_{CNT}$ obtained from the torque detection result at the output stage of the motor (plant 104).

$$F_{CNT}^{ref} = K_{P\_F}(F_{CNT}^{cmd} - F_{CNT}) \quad (8)$$

Under the position control mode, the switches SW1 and SW2 in FIG. 5 are both connected to the terminal 2. In this embodiment, the control system is grounded in the acceleration control, and the position target value is transformed into the force target value by a PD (Proportional Differential) controller. Accordingly, the PD controller generates the force target value $F_{CNT}^{cmd}$ expressed by Equation (10) on the basis of the input position target value $P_{CNT}^{cmd}$ and the position control value $P_{CNT}$ obtained from the joint position detection result at the output stage of the motor (plant 104). And, the integrated force/position controller 101 generates the force command value $F_{CNT}^{ref}$ expressed by Equation (9) on the basis of the force target value $F_{CNT}^{cmd}$ output from the PD controller and the force control value $F_{CNT}$ obtained from the torque detection result at the output stage of the motor (plant 104).

$$F_{CNT}^{ref} = K_{P\_F}(F_{CNT}^{cmd} - F_{CNT}) \quad (9)$$

$$F_{CNT}^{cmd} = K_{D\_P}(K_{P\_P}(P_{CNT}^{cmd} - P_{CNT}) - \dot{P}_{CNT}) \quad (10)$$

Under the position control mode with force constraint, the switch SW1 in FIG. 5 is connected to the terminal 2, and the switch SW2 is connected to the terminal 1. In this embodiment, the control system is grounded in the acceleration control, and the PD controller generates the force target value $F_{CNT}^{cmd}$ expressed by Equation (12) on the basis of the input position target value $P_{CNT}^{cmd}$ and the position control value $P_{CNT}$ obtained from the joint position detection result at the output stage of the motor (plant 104) (same as above). In addition, under the position control mode with force constraint, in order to place suppressing the application of a large impact force before satisfying the position target value $P_{CNT}^{cmd}$, a limiter is provided to limit the force target value $F_{CNT}^{cmd}$. In the limiter, a force limit value $F_{CNT}^{max}$ is set, and when the force target value $F_{CNT}^{cmd}$ does not exceed the force limit value $F_{CNT}^{max}$ the force target value $F_{CNT}^{cmd}$ is output as it is. Meanwhile, when the force target value $F_{CNT}^{cmd}$ exceeds the force limit value $F_{CNT}^{max}$, the force target value $F_{CNT}^{cmd}$ is substituted with the force limit value $F_{CNT}^{max}$, and force limit value $F_{CNT}^{max}$ is output. Furthermore, the integrated force/position controller 101 generates the force command value $F_{CNT}^{ref}$ expressed by Equation (11) on the basis of the force target value $F_{CNT}^{cmd}$ or the force limit value $F_{CNT}^{max}$ output from the limiter and the force control value $F_{CNT}$ obtained from the torque detection result at the output stage of the motor (plant 104).

$$F_{CNT}^{ref} = \begin{cases} K_{P\_F}(F_{CNT}^{cmd} - F_{CNT}) & \text{if } |F_{CNT}^{cmd}| < F_{CNT}^{max} \\ K_{P\_F}(F_{CNT}^{max} - F_{CNT}) & \text{if } F_{CNT}^{cmd} > F_{CNT}^{max} \\ K_{P\_F}(-F_{CNT}^{max} - F_{CNT}) & \text{if } F_{CNT}^{cmd} < -F_{CNT}^{max} \end{cases} \quad (11)$$

$$F_{CNT}^{cmd} = K_{D\_P}(K_{P\_P}(P_{CNT}^{cmd} - P_{CNT}) - \dot{P}_{CNT}) \quad (12)$$

As such, under the position control mode with force constraint, the force target value $F_{CNT}^{cmd}$ can be limited so as not to the magnitude of the external force to exceed the set value. In addition, when switching, the force command value $F_{CNT}^{ref}$ that is input to the subsequent robust angular acceleration controller 103 can become continuous.

As the known researches, for example, T. Murakami, F. Yu, K. Ohnishi, "Torque sensorless control in multidegree-of-freedom manipulator" (IEEE Transactions on Industrial Electronics, Vol. 40, No. 2, pp. 259-265, Apr., 1993), there is known a method that generates an acceleration reference value from a force command value, and transforms the acceleration reference value into a joint angular acceleration command value. In this case, however, there is a problem in that it is necessary to use an inverse matrix of a Jacobian matrix for such transform, and a control system becomes unstable during an unusual posture. In contrast, in this embodiment, the coordinate/space transformer 102 transforms the force command value into the torque command value by the transpose matrix JacoT of the Jacobian matrix (see Equation (5)), and a control system does not become unstable during an unusual posture.

Grasp Control:

Here, a control method when the hybrid position/force control described above is applied to a grasp operation of an object by a robot hand manipulator will be described.

Figure 6:
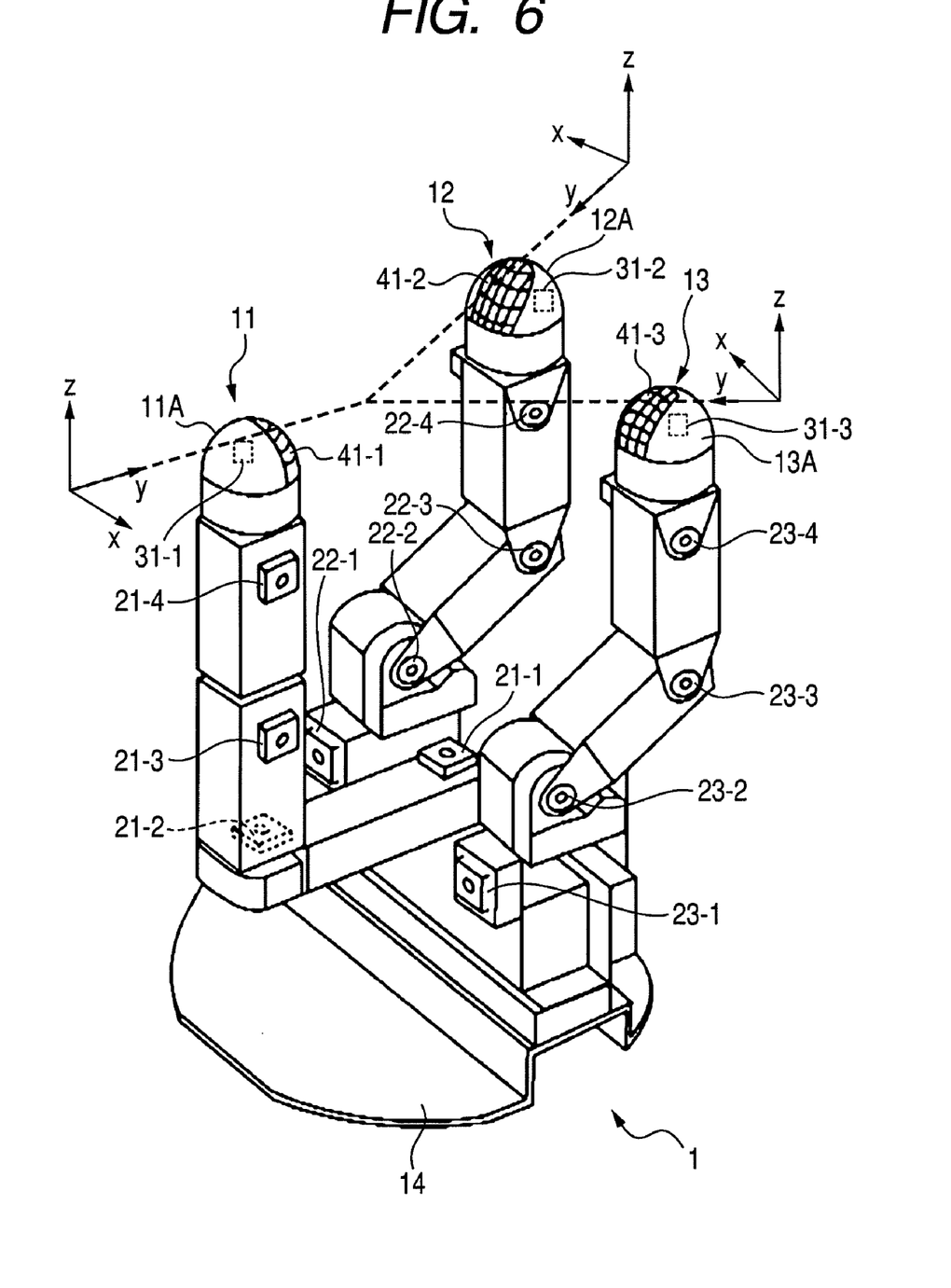
FIG. 6 is a diagram showing the exterior configuration of a robot hand manipulator.
Figure 7:
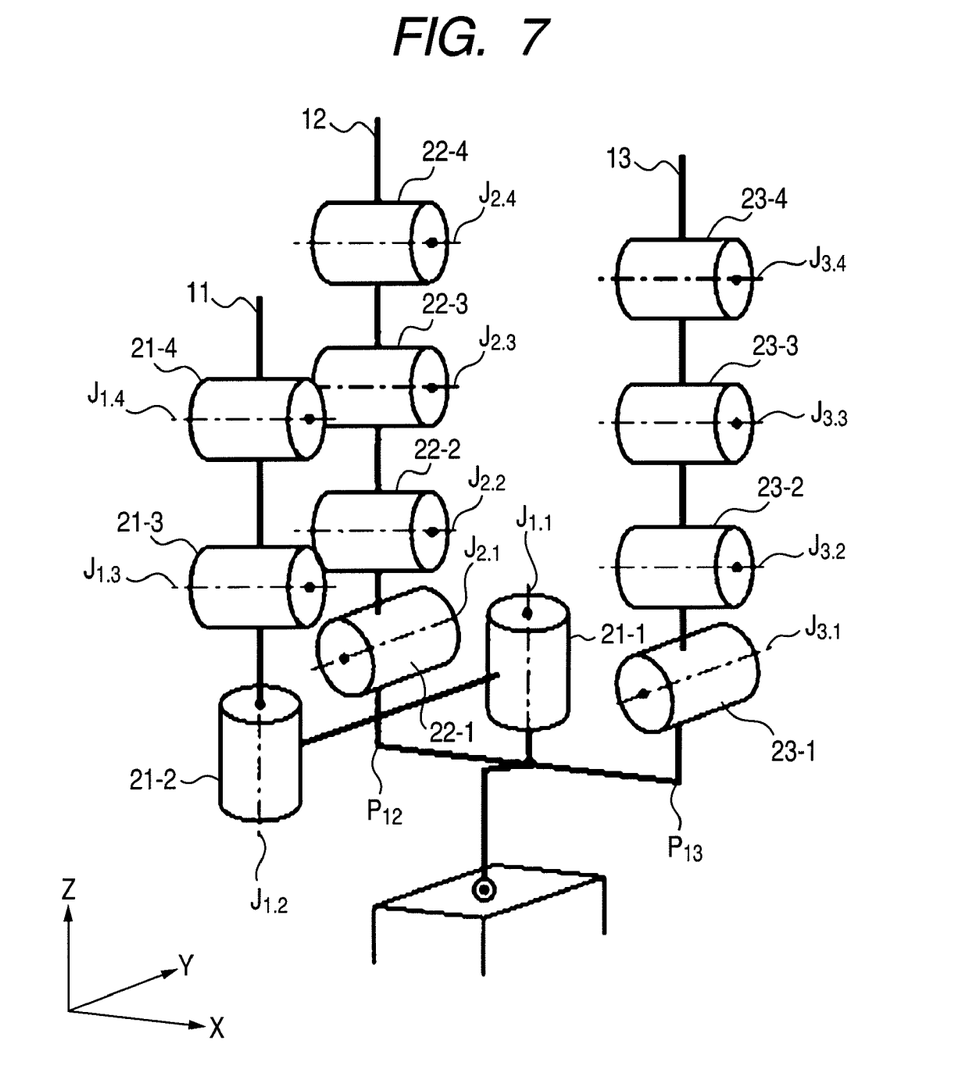
FIG. 7 is a diagram showing the configuration of a degree of freedom of a joint in the robot hand manipulator shown in FIG. 6.

FIG. 6 shows the exterior configuration of a robot hand manipulator. FIG. 7 shows the configuration of a degree of freedom of a joint in the robot hand manipulator shown in FIG. 6. A robot hand manipulator 1 shown in FIG. 6 has a palm section 14, and a finger mechanism that is arranged on the top surface of the palm section 14 and has a thumb 11, a middle finger 12, and a forefinger 13 corresponding to a thumb, a middle finger, and a forefinger of a human being. The robot hand manipulator 1 is mounted on, for example, a movement device (not shown) corresponding to an arm of a human being, and is connected to an imaging device (not shown) corresponding to an eye of a human being.

The entire robot hand manipulator 1 is moved toward an object to grasp along a captured image of the object obtained from the imaging device by the movement device, and then the thumb 11, the middle finger 12, and the forefinger 13 grasp the object.

In an initial state, the thumb 11, the middle finger 12, and the forefinger 13 are arranged such that a surface corresponding to the palmar surface of the thumb 11 and the palmar surfaces of the middle finger 12 and the forefinger 13 face each other. Each of the thumb 11, the middle finger 12, and the forefinger 13 has four joints, for example, first to fourth joints, and can move with four degrees of freedom.

The joints of the thumb 11 moves when driving shafts are correspondingly driven by drivers 21-1 to 21-4. As shown in FIG. 7, the fourth joint (base joint) of the thumb 11 is rotated around a yaw axis J1.1 by the driver 21-1, and the third joint is rotated around a yaw axis J1.2 by the driver 21-2. In addition, the second joint is rotated around a roll axis J1.3 by the driver 21-3, and the first joint is rotated around a roll axis J1.4 by the driver 21-4. Accordingly, the thumb 11 can move (that is, revolve) around the axis J1.1 and the axis J1.2 with respect to the middle finger 12 and the forefinger 13, and can bend its fingertip section 11A (that is, a section corresponding to the fingertip of the thumb) toward a side facing the middle finger 12 and the forefinger 13 or an opposite side.

Moreover, the axis J1.1 of the thumb 11 exists at an intermediate position between the base positions (the joint positions with the palm section 14) P12 and P13 of the middle finger 12 and the forefinger 13.

The joints of the middle finger 12 move when driving shafts are correspondingly driven by drivers 22-1 to 22-4. The fourth joint (base joint) of the middle finger 12 is rotated around a roll axis J2.1 by the driver 22-1. The third joint is rotated around a roll axis J2.2 by the driver 22-2, the second joint is rotated around a roll axis J2.3 by the driver 22-3, and the first joint is rotated around a roll axis J2.4 by the driver 22-4. Accordingly, the middle finger 12 can bend its fingertip section 12A (that is, a section corresponding to the fingertip of the middle finger) toward a side facing the thumb 11 or an opposite side. In addition, the entire middle finger 12 can be inclined toward a side on which the forefinger 13 is located or an opposite side.

The forefinger 13 has the same function as that of the middle finger 12. That is, the joints of the forefinger 13 move when driving shafts are correspondingly driven by drivers 23-1 to 23-4. The fourth joint (base joint) of the forefinger 13 is rotated around a roll axis J3.1 by the driver 23-1. The third joint is rotated around a roll axis J3.2 by the driver 23-2, the second joint is rotated around a roll axis J3.3 by the driver 23-3, and the first joint is rotated around a roll axis J3.4 by the driver 23-4. Accordingly, the forefinger 13 can bend its fingertip section 13A toward a side facing the thumb 11 or an opposite side, and the entire forefinger 13 can be inclined toward a side on which the middle finger 12 is located or an opposite side.

Figure 8:
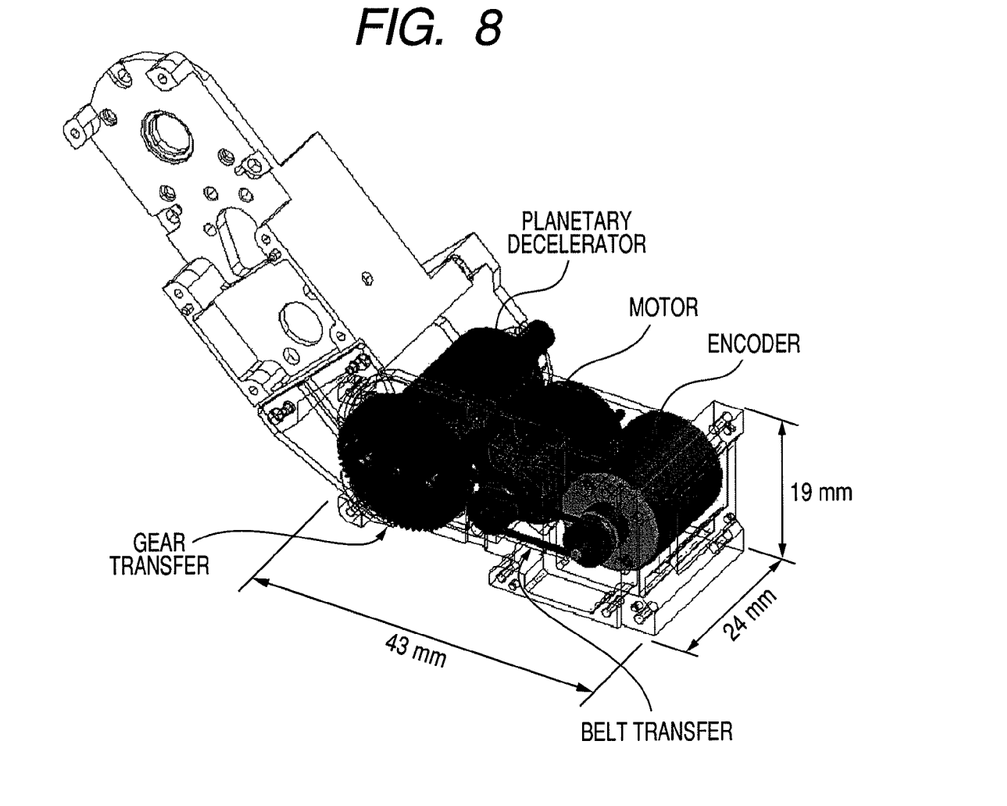
FIG. 8 is a diagram showing an example of the arrangement example of a motor, a decelerator, and an encoder in a finger of the robot hand manipulator shown in FIG. 6.

Moreover, the length from a wrist section of the hand to the fingertip is 191 [mm], and the length of the finger is 162 [mm], and the weight of the finger is 1.0 [kg]. Four degrees of freedom for each finger, that is, 12 degrees of freedom are provided in total. Each axis includes two motors of starting torque $8.7 \times 10^{-3}$ [Nm] and $5.6 \times 10^{-3}$ [Nm], and four decelerators of 1/100 to 1/200. In addition, an encoder of 16000 pulse/rev is provided at the output stage of the motor. While an encoder of high resolution tends to be large, as shown in FIG. 8, if the encoder is arranged in parallel with the motor and the decelerator, the conversion efficiency in the decelerator can be improved, and the length of the finger can be shortened. The configuration of the driving system is optimally designed with respect to a fingertip generating force, a hand shape, and a grasp pattern by combination of two motors and four decelerators. The grasp pattern references a Kamakura grasp pattern.

A six-axis force sensor is provided in each fingertip, and a pressure in a normal direction can be measured at an interval of approximately 3 [mm] by a distribution contact sensor. In addition, the surface of the fingertip is covered with a viscoelastic body. It is confirmed that a force of 4.0 [N] is generated at the fingertip of the thumb, and a force of 2.0 [N] is generated at the fingertips of the forefinger and the middle finger.

Central control is performed on a PC on which Pentium (Registered Trademark) 4 (3.8 GHz) commercially available from Intel Corporation in U.S.A. is mounted as a controller, and a current command value is input to a servo amplifier. A real time OS, RTLinux Pro2.2, is used, and a control cycle is 0.25 [msec].

The hand is installed in the robot arm (MOTOMAN-UPJ) which is manufactured by Yasukawa Electric Corporation. The arm operates under the position control. While the current command value is output from the PC to the servo pack of the robot arm to perform feedback control, a disturbance observer is provided to improve the robustness of the position control, and damping control is also provided to suppress vibration at the tip of the hand.

When the grasp operation is carried out under the force control, if a slight error exists in the contact force, the object gradually starts to move. This is also caused by weak offset noise such as inter-axis interference in a multi-axis force sensor. In this embodiment, in order to overcome such a problem, the "position control with force constraint" is performed in a direction perpendicular to the surface of the object to grasp, and the position control is performed in a tangential direction.

For this purpose, as shown in FIG. 6, a coordinate system for integrated force/position control is set, and control is performed independently on each axis of the coordinate system. For example, if the position control is performed on the x axis and the z axis, and the force control is performed on the y axis, the fingertip moves on a line parallel to the y axis. Basically, the coordinate axis is fixed in a world space, but it may be changed, if necessary, for example, when the object to grasp is changed.

In order to confirm the characteristic of the integrated force/position control, an experiment in which the thumb is pressed against a fixed metal plate, was carried out. At a time t=0, the finger is separated from a wall, and during a period from t=0.6 to t=3.6, the position command value approximates the wall, and the finger is moved inward of the wall. At a time t=3, the finger collides against the wall and stops. In respects to the control mode, a period from t=0 to t=2 corresponds to the position control mode, a period from t=2 to t=6 corresponds to the position control mode with force constraint, and a period from t=6 to t=10 corresponds to the force control mode.

Figure 9:
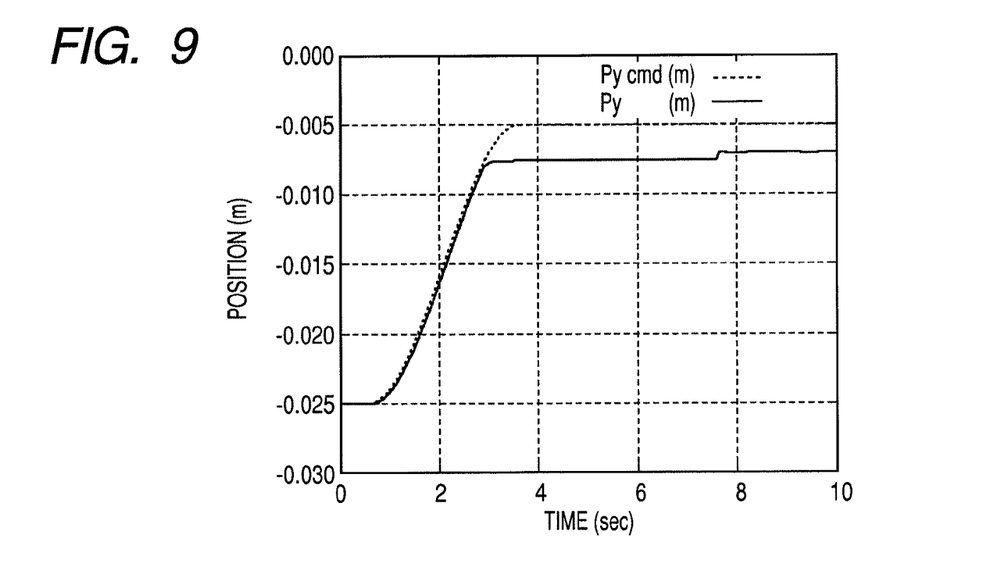
FIG. 9 is a diagram showing the position response result of a finger-pressing experiment.

FIG. 9 shows the position response result of the finger pressing experiment. During the period from t=0.6 to t=3.6, the position command value approximates the wall, and the finger is moved inward of the wall. At the time t=3, the finger collides against the wall and stops.

Figure 10:
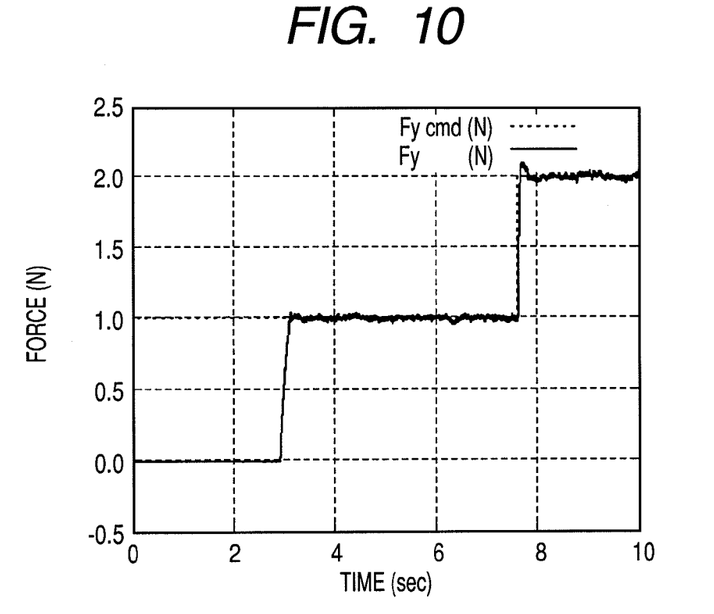
FIG. 10 is a diagram showing the force response result of a finger-pressing experiment.

FIG. 10 shows the force response result of the finger pressing experiment. When collision (t=3 sec), if the force command value is changed steplike (t=7.6 sec), an overshoot is also small. (Other than the low pass filter of 100 rad/sec used in the control system, smoothing for graph display is not performed.) From FIG. 10, it can be seen that while the force limit value when collision is 1.0 N, an impact force when collision is suppressed, and an operation is carried out smoothly.

Figure 11:
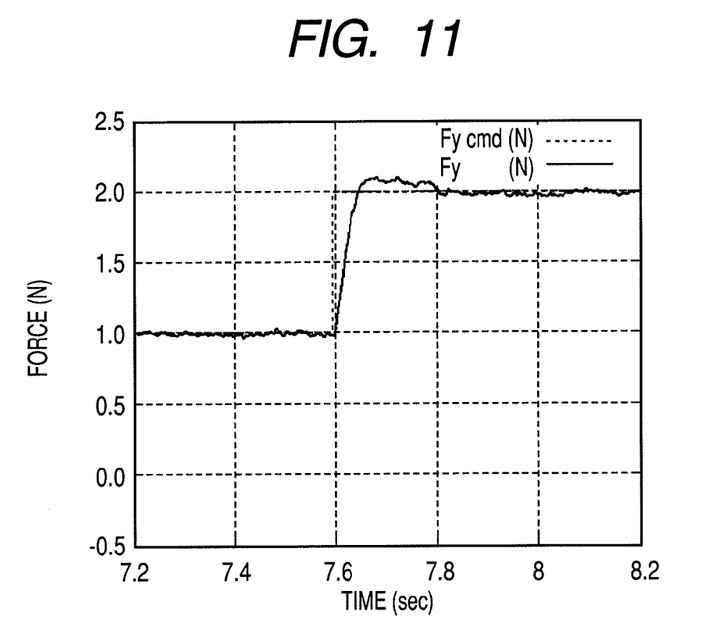
FIG. 11 is a diagram showing a force step response.

FIG. 11 shows a force step response. In FIG. 11, a portion where the command value is increased steplike from 1.0 N to 2.0 N is enlarged, and a rising time is approximately 30 msec. In view of a multi-joint hand having a decelerator, a satisfactory result is obtained. In addition, disturbances such as gear friction and the weight of the cable can be suppressed. Furthermore, it can be seen that mode switching is smoothly carried out.

Moreover, when the finger is pressed against the object under the position control mode with force constraint, if the force limit value is changed, the contact force follows the change in the force limit value. This behavior is identical to the force command value following characteristic under the force control mode.

Figure 12:
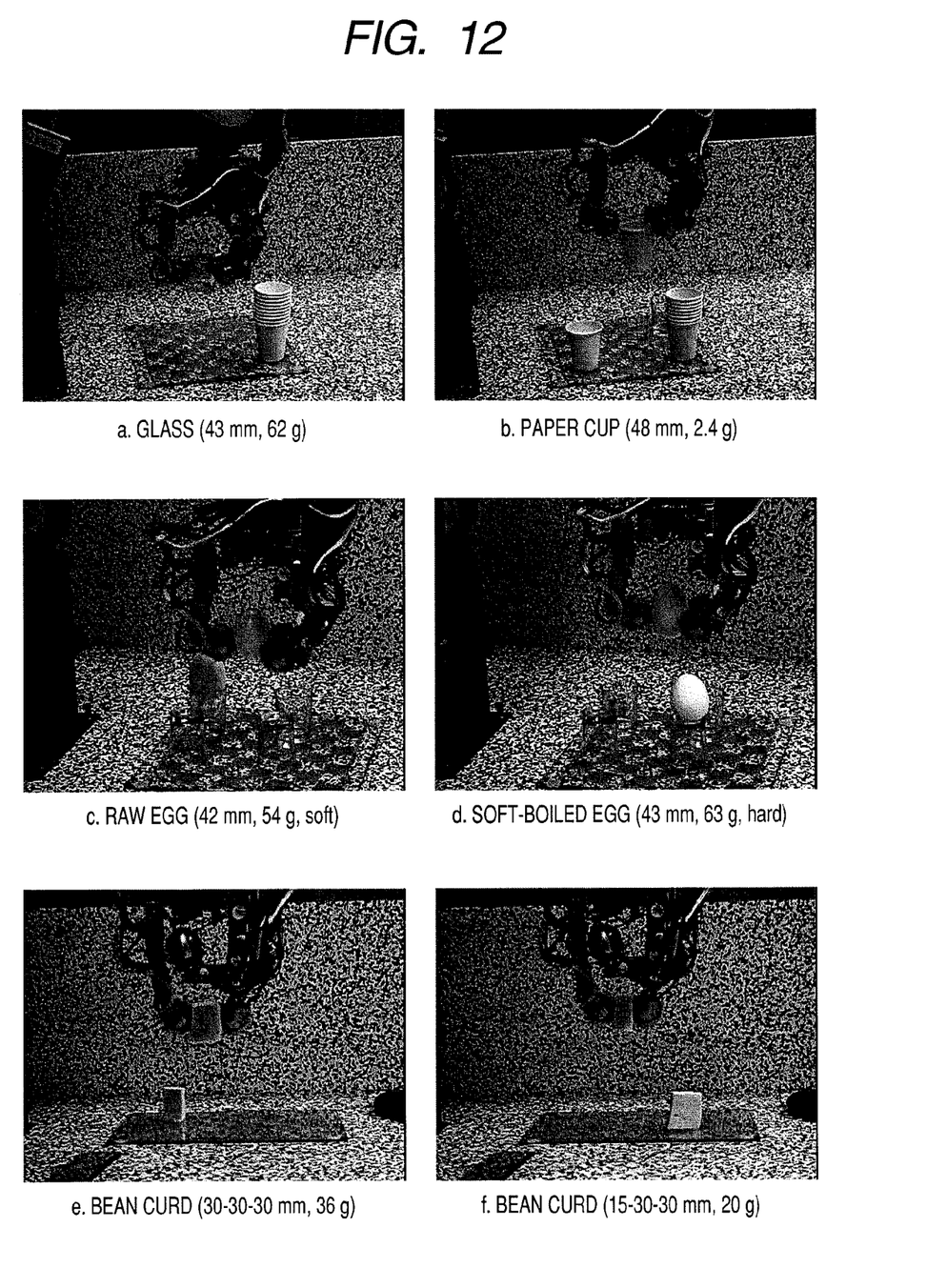
FIG. 12 is a diagram showing examples in which various objects are grasped.

In addition, the object is grasped by using the integrated force/position control. One of the merits of the force control is that, even if the shape of the object is not exactly known, the object can be stably grasped. In the experiment, objects having different shapes, masses, and stiffness are prepared, and the grasp operation is carried out. FIG. 12 shows snapshots of examples when the object is lifted and moved by the arm under the position control after being grasped. In FIG. 12, a shows an example in which a glass is grasped, and b shows an example in which a paper cup is grasped. The property of the object is shown in the drawing. An object having a different diameter or mass can be grasped. c shows an example in which a soft-boiled egg is grasped, and d shows an example in which a raw egg is grasped. In order to make the deformation volume small, in case of b, the contact force is weak (0.25 N), and in case of a and c, the same control parameters and the same grasp force (1.5 N) are given.

In case of e and f, bean curds having different sizes are grasped with two fingers. In both cases, the bean curds are grasped with the same control parameters and the same grasp force 1.0 N.

Moreover, since the force limit value is set to 0.15 N even if the initial position of the glass is misaligned when the glass is grasped, a finger that comes into contact with the glass earlier is stopped without felling the glass, and stably grasps the glass together with a finger which comes into contact with the glass later.

While the invention has been described in connection with the specific embodiment, it is obvious that those skilled in the art may change the embodiment and provide a substitute for the embodiment within the range not departing from the scope and spirit of the invention.

In this specification, a case in which a manipulator having a plurality of fingers grasps an object has been described, but the invention is not limited thereto. The invention can be applied to various robot apparatuses which has a multi-link structure having a plurality of links and joints serving as link movable sections, and has a chance to come into contact with external worlds such as objects.

In summary, the present invention has been exemplified by describing an embodiment as an example. However, the contents of the specification should not be interpreted as limitations imposed on the present invention. In order to determine essentials of the present invention, the reader is suggested to refer to claims appended to the specification.

What is claimed is:

1. A robot apparatus for grasping an object, the robot apparatus has a multi-link structure including a plurality of links and joints serving as link movable sections, and in which at least some of the links are driven by combination of position control and force control, the robot apparatus comprising:
    position control means for performing, prior to contact with the object, the position control on the links, which are driven by the combination of position control and force control;
    position control with force constraint means for placing the force control before the position control upon contact with the object to be grasp so as not to cause a magnitude of an external force on the object to exceed a set value even if the position control is performed on the links;
    force control means for performing the force control on the links after contact with the object; and
    integrated force/position control means for controlling driving of the joints by switching between the position control means, the position control with force constraint means, and the force control means, and unifying the position control and the force control.

2. The robot apparatus according to claim 1,
    wherein the position control means and the position control with force constraint means generates a force target value of each link from a position target value for the link, and
    the integrated force/position control means generates a force command value of the link from the force target value output from the position control means, the position control with force constraint means, or the force control means.

3. The robot apparatus according to claim 2, further comprising:
    robust acceleration control means for performing robust acceleration control for the joint by estimating various disturbances acting on a motor for driving the joint by using a disturbance observer, and eliminating influence by the disturbances on a control system from the force command value output from the integrated force/position control means.

4. The robot apparatus according to claim 2,
    wherein the position control means and the position control with force constraint means transform the position target value for the link into the force target value of the link by using a PD (Proportional Differential) controller.

5. The robot apparatus according to claim 2,
    wherein the position control with force constraint means sets a predetermined force limit value, when the force target value obtained by transforming the position target value for the link does not exceed the force limit value, outputs the force target value as it is, and when the force target value exceeds the force limit value, substitutes the force target value with the force limit value and outputs the force limit value.

6. A method of controlling a robot apparatus to grasp an object, the robot apparatus has a multi-link structure including a plurality of links and joints serving as link movable sections, and in which at least some of the links are driven by combination of position control and force control, the method comprising the steps of:
    performing, prior to contact with the object, the position control on the links, which are driven by the combination of position control and force control;
    placing the force control before the position control upon contact with the object to be grasp so as not to cause a magnitude of an external force on the object to exceed a set value even if the position control is performed on the links; and
    performing the force control on the links after contact with the object.

7. The method according to claim 6,
    wherein, in the step of performing the position control and the step of placing the force control before the position control, a force target value of the link is generated from the position target value for the link, and
    the method further comprising a step of:
    generating a force command value of the link from the force target value obtained by the step of performing the position control, the step of placing the force control before the position control, or the step of performing the force control.

8. The method according to claim 7, further comprising the step of:
    performing robust acceleration control for the joint by estimating various disturbances acting on a motor for driving the joint by using a disturbance observer, and eliminating influence by the disturbances on a control system from the force command value generated by the step of generating the force command value.

9. The method of claim 7,
wherein, in the step of performing the position control and the step of placing the force control before the position control, the position target value for the link is transformed into the force target value of the link by using a PD controller.

10. The method according to claim 7,
wherein, in the step of placing the force control before the position control, a predetermined force limit value is set, when the force target value obtained by transforming the position target value for the link does not exceed the force limit value, the force target value is output as it is, and when the force target value exceeds the force limit value, the force target value is substituted with the force limit value and the force limit value is output.

11. A robot apparatus for grasping an object, the robot apparatus has a multi-link structure including a plurality of links and joints serving as link movable sections, and in which at least some of the links are driven by combination of position control and force control, the robot apparatus comprising:
- a position controller performing, prior to contact with the object, the position control on the links, which are driven by the combination of position control and force control;
- a position controller with force constraint placing the force control before the position control upon contact with the object to be grasp so as not to cause a magnitude of an external force on the object to exceed a set value even if the position control is performed on the links;
- a force controller performing the force control on the links after contact with the object; and
- an integrated force/position controller controlling driving of the joints by switching between the position controller, the position controller with force constraint, and the force controller, and unifying the position control and the force control.

* * * * *